No. 716,834. Patented Dec. 23, 1902.
N. B. EVANS.
GANG OF COLLAR BUTTON POSTS.
(Application filed Apr. 3, 1902.)
(No Model.)
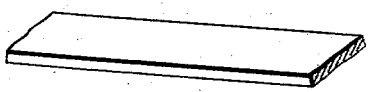
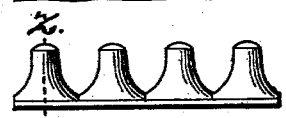
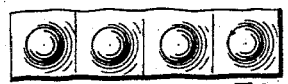
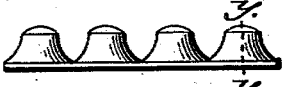
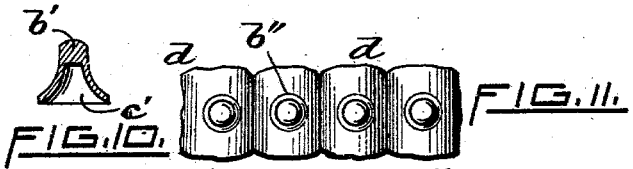
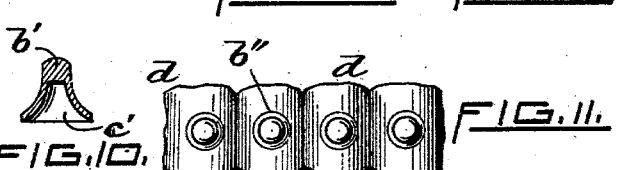
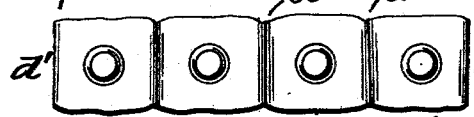
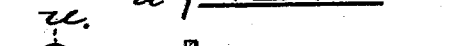
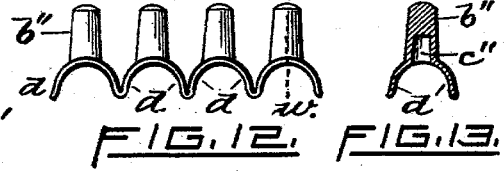
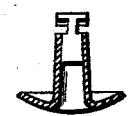
WITNESSES.
Charles T. Hannigan
Annie E. Perce
INVENTOR.
Nathan B. Evans.
By Warren R. Perce
Atty.

UNITED STATES PATENT OFFICE.

NATHAN B. EVANS, OF PROVIDENCE, RHODE ISLAND.

GANG OF COLLAR-BUTTON POSTS.

SPECIFICATION forming part of Letters Patent No. 716,834, dated December 23, 1902.

Application filed April 3, 1902. Serial No. 101,210. (No model.)

*To all whom it may concern:*

Be it known that I, NATHAN B. EVANS, a citizen of the United States, residing at Providence, in the county of Providence and State of Rhode Island, have invented certain new and useful Improvements in Gangs of Collar-Button Posts, of which the following is a specification, reference being had therein to the accompanying drawings.
Figure 1 is a perspective view of a bar or strip of brass or composition metal from which a gang or series of collar-button posts is to be formed. Fig. 2 is a top plan view of said bar or strip of stock after it has been subjected to die action and shaped thereby into a series or gang of equal, equidistant, integral, and shallow cups. Fig. 3 is a side elevation of the same. Fig. 4 is a transverse section as seen on line $x\,x$ of Fig. 3. Fig. 5 is a top plan view of said bar or strip of stock after it has been subjected to further die action whereby all of said shallow cups are simultaneously developed or elongated by forming the interior of each cup with a socket which corresponds in shape to the exterior surface thereof. Fig. 6 is a side elevation of the same. Fig. 7 is a transverse section as seen on line $y\,y$ of Fig. 6. Fig. 8 is a top plan view of the gang or series of cups so formed after the same has been subjected to another die action whereby all said cups are further developed and elongated. Fig. 9 is a side elevation of the same. Fig. 10 is a transverse section as seen on line $z\,z$ of Fig.
9. Fig. 11 is a top plan view of the gang or series after the same has been developed and elongated by another die action into a series of posts each having an interior socket, the portion of the strip between the posts at the bases thereof being thinned, spread, and curved into a series of parallel semitubular forms the axial lines of which are at right angles to the longitudinal axial line of said strip. Fig. 12 is a side elevation of the same.
Fig. 13 is a transverse section as seen on line $w\,w$ of Fig. 12. Fig. 14 is a top plan view of my improved gang or series of collar-button posts when the same is completed. Fig. 15 is a side elevation of the same. Fig. 16 is a transverse section as seen on line $v\,v$ of Fig. 15. Fig. 17 is a front elevation of a single collar-button post after the same has been separated from the gang and its base has been curved to form a shoe. Fig. 18 is a central longitudinal section thereof as seen on line $u\,u$ of Fig. 17. Fig. 19 is a view, partly in central longitudinal section and partly in front elevation, showing the common method of making a collar-button post, the upper end consisting, as usual, of an inserted block secured within the hollow post by soldering or otherwise.

My invention relates to the manufacture of the posts of collar-buttons and is a new article of manufacture consisting of a series or gang of collar-button posts integrally formed, each of which posts has a hollow body portion, with a flaring shoe or base and a solid head, preferably oblong or oval in cross-section.

I take a bar or strip of brass, composition, or other suitable metal rectangular in cross-section, as shown in Fig. 1, and by a die and press adapted for the purpose form said bar into a series or gang of equal, equidistant, integral, and shallow cups, as shown in top plan, side elevation, and central transverse section in Figs. 2, 3, and 4. In this operation I use a forcer or plunger whose end is plane—
that is, flat and smooth. The curvature of the bottom of said depression (shown at $a$ in Fig. 4) is caused by the formation of an air-cushion, which assists in forcing the stock into the matrix of the die. In a second operation said bar, which has been formed as shown in Figs. 2, 3, and 4, is subjected in a press to the action of a die, which simultaneously elongates all these cup-shaped protuberances and forces the greater proportional part of the stock to the outer end of each cup to form a head, as shown at $b$ in Fig. 7, with a square-bottomed depression $c$, as seen in said figure. This second operation is fully illustrated in Figs. 5, 6, and 7.

As thus far described, there has been formed a metallic strip having on one side a series of protuberances each having a depression therein. This constitutes a novel and useful gang-finding for jeweler's use, which can be developed by suitable dies and plungers into seamless balls, heads, stud-backs, collar-button posts, watch-chain bars, and other articles of jewelry. In a third operation said gang or series of protuberances is further subjected in a drop-press to the action of a die, which elongates them, as shown in Figs. 8, 9, and 10, where it is seen that the head $b$ of Fig. 7 has been shaped into the cylindrical solid head $b'$ of Fig. 10 and the depression $c$ of Fig. 7 has been enlarged to form the depression $c'$ of Fig. 10. In a fourth operation said series as left by the third operation is further subjected to die action, whereby the heads $b'$ are elongated to a slightly-tapering (but nearly cylindrical) post $b''$ and the depression $c'$ into a correspondingly-shaped socket or depression $c''$, which extends nearly half the length of said post, and the parts of the strip which have constituted the flaring bases of the protuberances $b'$ are thinned, spread, and shaped into a series of parallel semitubular bases $d$, connected together, whose axial lines extend at right angles with the axial lines of the posts $b''$, as fully illustrated in Figs. 11, 12, and 13. In a fifth operation the series as formed by the fourth operation is subjected to further die action, by which the semitubular bases $d$ are flattened out, as shown at $d'$, with grooves $d''$ midway between the posts, and the posts are compressed, if desired, so as to be oblong, oval, or otherwise shaped in cross-section. This fifth operation is shown in Figs. 14 and 15. The series thus formed is separated by any suitable tool along the lines of the grooves $d''$, and each part so secured becomes a single collar-button post, as seen in Fig. 16, consisting of an integral post, solid for one-half or more of its length, at the outer or smaller end, but having a concentric socket in its inner or larger end and a base surrounding the lower part of said post. This base may be cut circular in outline and bent up to form the curved shoe $e$, as in Figs. 17 and 18.

The hollow posts of collar-buttons have heretofore been commonly made of two parts—a trumpet-shaped tube, in whose smaller open end a solid plug or block is inserted and soldered or otherwise fastened, on which plug or block the cross-head has been formed. This common form of construction is illustrated in Fig. 21. By my invention a collar-button post is produced which is integral, so that soldering is dispensed with. Such collar-button posts are much more cheaply made when formed in a gang or series than when made singly.

It is obvious that the post and head of the collar-button may be circular, oval, or angular in cross-section, as may be preferred.

In the progress of my experiments and invention of this improved gang of collar-button posts I have found that the matrices of the dies required are so close together that it is very difficult to obtain a sufficient spread of the stock between the posts to form in a plane the base which surrounds each of the posts at the bottom thereof and that there is a tendency of the posts, being tapering in shape, to act like wedges and split the die during the operation. These difficulties I have overcome in the manner shown in Figs. 11, 12, and 13, by which the portions of the metallic strip which are between the posts, at the bases thereof, are developed and shaped into the curved or semitubular form, the axial line of which is at a right angle with the plane of the posts. This curved portion or web when flattened out by dies, as shown in Figs. 14 and 15, gives sufficient distance between the posts to get out the bases and at the same time causes some of the action of the applied force to be exerted at a right angle to the direction in which it would otherwise have acted.

The manufacture of these articles in a gang or integral series is entirely new in the art to which this invention pertains and is of great utility, inasmuch as it results in a saving of time, labor, and stock. By the method now commonly employed of cutting circular blanks out of flat stock and striking up such blanks by a die and plunger there is a considerable loss of material, whereas in my method of manufacture above specified all the stock is used without any waste, thus effecting a saving of stock amounting to nearly one-third thereof, and by these various operations, as described, the metal is caused to flow to the places where most needed.

In the common method of making collar-button posts singly by a die and plunger difficulty is experienced because the matrix of the die is so deep and the plunger extending therein is so long that the slightest displacement or improper inclination of the stock causes the plunger to strike to one side instead of squarely, and the force of the blow is liable to bend or break the plunger, crack or split the die, and spoil the stock; but in my invention, as above described, at the first only very shallow short protuberances or cups are struck up from the flat stock, with an excess of metal in the closed end of said cups, and these protuberances or cups are gradually elongated and shaped by the successive die operations, so that the stock can be controlled in its flow or distribution and made thicker or thinner in places, as desired.

It is to be noticed that when the collar-button posts are made in gangs each post supports and assists in adjusting the others in relation to the die, and this coöperative action secures accuracy of position during the operation.

By my invention a collar-button post is produced which is solid for one-half (or more) of its length at its smaller end, and which is better and stronger than the usual collar-button posts, and which may be cut down at its solid smaller end to any desired length. These solid heads allow a variation of depths, sizes, or location of lateral diametrical grooves therein for the purpose of mounting on said post the oscillating or tilting front of the collar-button.

While this invention is mainly intended for the manufacture of collar-button posts, some of the intermediate forms produced in the course of the development of the stock are themselves not only novel, but very useful as jewelers' findings, from which many kinds of articles of jewelry other than collar-button posts can be made by means of suitable dies.

I claim as a novel and useful invention and desire to secure by Letters Patent—

1. As a new article of manufacture, a series or gang of collar-button posts, formed integrally of a strip of metal, each having a hollow shank and a solid head and provided with connected bases, substantially as specified.

2. As a new article of manufacture, a series or gang of collar-button posts, formed integrally of a strip of metal, each having its shank solid for the greater part of its length from the smaller end, and its remaining part hollow and provided with bases at the larger end of the shank adjacent thereto and connected *seriatim*, substantially as described.

3. As a new article of manufacture, a gang of protuberant cups formed integrally with a metallic strip, each of which cups has its closed end thicker than its sides, substantially as specified.

4. As a new article of manufacture, a gang of protuberant cups formed integrally with a metallic strip, each of which cups has a thick closed bottom and sides of graduated thickness, substantially as set forth.

5. As a new article of manufacture, a gang of posts formed integrally of a metallic strip and connected *seriatim* by parallel bases, each of which bases is semitubular in cross-section in the plane of said posts, substantially as described.

6. As a new article of manufacture, a gang of posts formed integrally of a metallic strip, each of which posts comprises a long solid head or outer end and a short hollow shank, and provided with parallel bases which connect said posts *seriatim*, each of which bases is semitubular in cross-section in the plane of said posts, substantially as specified.

In testimony whereof I affix my signature in presence of two witnesses.

NATHAN B. EVANS.

Witnesses:
SAMUEL S. STONE,
WARREN R. PERCE.